(No Model.)
M. M. CULVER & M. W. BEACH.
WIRE GATHERING AND DISBURSING MACHINE.
No. 306,677. Patented Oct. 14, 1884.
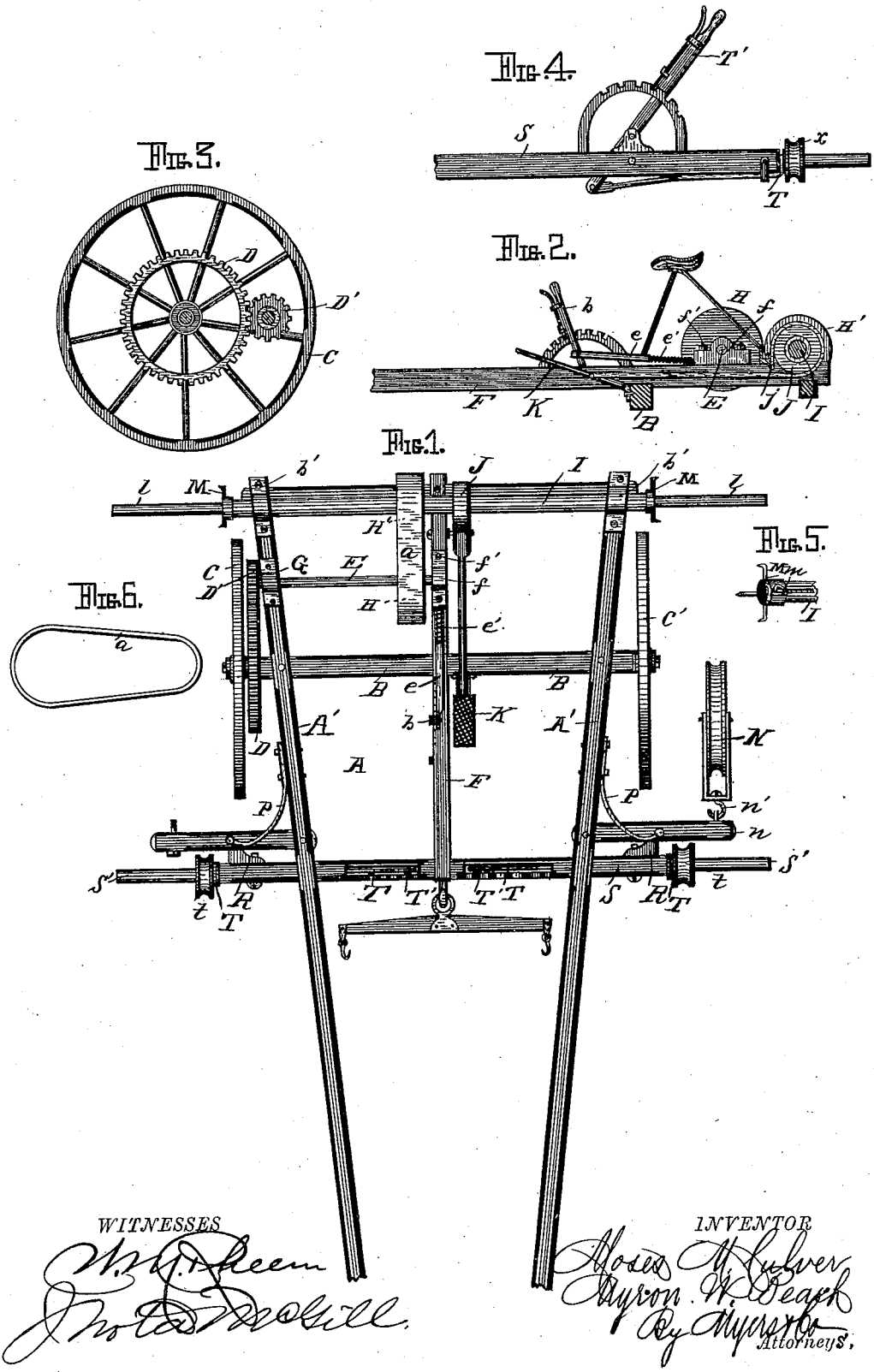
WITNESSES
INVENTOR

UNITED STATES PATENT OFFICE.

MOSES M. CULVER, OF GLIDDEN, AND MYRON W. BEACH, OF CARROLL, IOWA.

WIRE GATHERING AND DISBURSING MACHINE.

SPECIFICATION forming part of Letters Patent No. 306,677, dated October 14, 1884.

Application filed March 4, 1884. (No model.)

*To all whom it may concern:*

Be it known that we, MOSES M. CULVER and MYRON W. BEACH, citizens of the United States, residing, respectively, at Glidden and Carroll, in the county of Carroll and State of Iowa, have invented a new and useful Machine for Winding and Unwinding Smooth or Barbed Wire, of which the following is a specification.

This invention pertains to improvements in wire gathering and disbursing machines, having for its object to gather loose or unwound wire as it is taken from fence-posts and wind the same upon a spool, and to distribute the wire upon the ground when it is desired for use; and it consists in the detailed combination and arrangement of the parts, substantially as hereinafter more fully set forth, and pointed out in the claims.

In the accompanying drawings, Figure 1 is a plan view of our invention. Figs. 2, 3, 4, 5, and 6 are detail views thereof.

In the organization of our invention we employ an ordinary wagon-frame, A, having about at the center thereof an axle, B. To this axle are connected driving-wheels C C', and to the wheel C is attached, on its inner face, gear-wheel or pinion D, which gears with the smaller pinion D', connected to rotary shaft E. The shaft E is passed through a receptacle or box, G, on the side bar, A', which allows of the movement of said shaft in the direction of its length, and is held in position on the center beam, F, on which the driver's seat is placed, by means of another slotted receptacle or box, $f$, and this box is held in position by means of bolts $f'$, which permit of the forward and backward movement of the shaft E.

On the opposite end of the shaft E to that on which the pinion D' is placed is rigidly secured in position a frictional wheel, H, which is connected to another frictional wheel, H', on the shaft I by means of the belt $a$. (See Fig. 6.) The wheels H H' are caused to connect with more or less force, according as regulated by lever $b$, (see Fig. 2,) said lever being pivoted nearly at its lower end to a horizontal rod, $e$, to the end of which rod is attached a spiral spring, $e'$, which is connected to the receptacle or box $f$ on the center beam, F.

To the back end of the frame A is secured a long rotary shaft, I, which passes through the receptacles or boxes $b'$ $b'$ and extends a short distance beyond the sides of the frame A. On this shaft I is rigidly secured the frictional wheel H', connected to the wheel H by means of the belt $a$, as above described, and it is from this belt that the shaft I receives its rotary motion.

To the shaft I is also rigidly secured, about at the center of the shaft, and a short distance from the center beam, F, a small wheel, J, which is encompassed by a strip of steel, $j$, forming a brake upon wheel J, which is designed to regulate the motion and revolution of the shaft I, according as the size of the spool of wire on the rod $l$ inserted in the end of the shaft I (as will be hereinafter referred to) diminishes when unwinding the wire, and said brake is operated by means of the foot-lever K.

Into each end of the long shaft I is screwed or otherwise inserted a short rod or arm, $l$, designed for reception of a spool upon which the fence-wire is to be wound. Said spool (not here shown) is held firmly in position by means of the clutch or spider M, secured on the end of the shaft I by means of the hook $m$, thus causing the spool to be held on the rod or arm $l$ and to revolve in unison with the shaft I.

When it is desired to distribute the wire, and the same has been wound upon the spool, the end of the wire is passed forward over and around the pulley N, and the end is then carried backward and fastened at any desired point on the fence or ground, and as the machine moves forward the wire is distributed ready for use. The pulley N is provided with guttered or flanged edges, and is ribbed so as to protect the barbs on the wire from injury during the unwinding operation, and said pulley N is fastened to an arm, $n$, by means of a swivel-hook and eyebolt, $n'$, which is designed to allow the pulley to so adjust itself that the wire will be at or nearly at right angles with the spool during the unwinding operation. The arm $n$ is fastened to the under side of the side bar, A', and is held in place by means of bent spring-rods P, and is designed to give the wire slack or play in case it becomes caught from any cause while unwinding, and thus prevent breakage by sudden catching or jerking of the wire. The arm $n$ is prevented from too much forward movement by means of stops R, fastened to the front cross-beam, S. The front cross-beam, S, has a rod or sleeve S', attached to each end, and on this rod or sleeve the small pulley $t$ is disposed. Said pulley $t$ is similar to the larger pulley N as regards its grooved and ribbed portions, and is designed for the passage of the wire thereon as it is being wound upon the spool on the rod or arm $l$. The pulley $t$ guides the wire from side to side of the spool when winding, and is held in place by means of a clutch, T, as shown more fully in Fig. 4, and worked back and forth on the arm or rod S' by means of a lever, T'. The lever T' is placed on the front shaft, S, on each side of the center beam, F, and operates the pulley $t$, as shown.

It will be noticed that when it is desired both sides of our machine may be used for winding and unwinding the wire; or one side thereof may alone be used, according to the side upon which the wire is to be distributed.

Having thus fully described our invention, what we claim, and desire to secure by Letters Patent, is—

1. In a wire gathering and disbursing machine, the driving-wheel C, actuating gear-wheels D D', revolving shaft E, and indirectly rotating friction-wheels H H', having belt $a$, and actuating-shaft I, having arms or rods $l$, for reception of spools, secured by clutch or spider M, substantially as shown, and for the purpose described.

2. In a wire gathering and disbursing machine, the shaft I, having rods or extensions $l$, clutch or spider M, for holding the spool in position, and hook $m$, for securing said clutch or spider, pulley N, arm $n$, and rod P, substantially as shown and described.

3. The combination of the shaft E, passing through slotted box or receptacle G for the lengthwise movement of said shaft, slotted box or receptacle $f$ for the backward and forward movement of the shaft E, said box or receptacle $f$ being regulated in its movement by means of lever $b$, rod $e$, and spring $e'$, substantially as shown and described.

MOSES M. CULVER.
MYRON W. BEACH.

Attest:
RACHEL P. CULVER,
T. B. MOORE.